(No Model.)
D. HALLADAY.
Machine for Sawing Tank Staves.
No. 232,490. Patented Sept. 21, 1880.
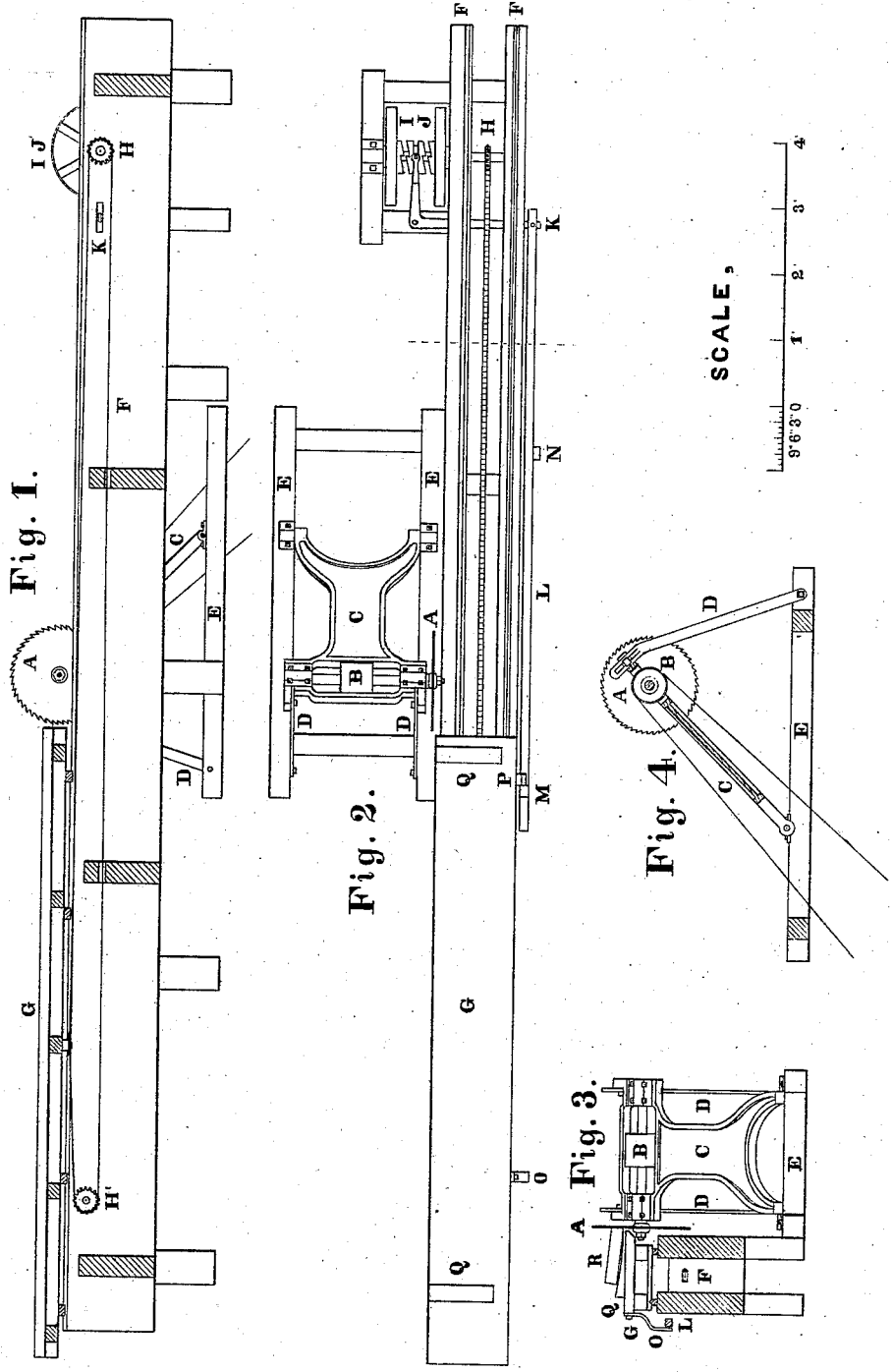
WITNESSES:
Edward J. Parker
George O. Spooner
INVENTOR:
Daniel Halladay

UNITED STATES PATENT OFFICE.

DANIEL HALLADAY, OF BATAVIA, ILLINOIS.

MACHINE FOR SAWING TANK-STAVES.

SPECIFICATION forming part of Letters Patent No. 232,490, dated September 21, 1880.

Application filed April 6, 1880. (No model.)

*To all whom it may concern:*

Be it known that I, DANIEL HALLADAY, of Batavia, Illinois, have invented a new and useful Machine for Sawing Tank-Staves, of which the following is a specification.

My invention relates to a machine for sawing tank-staves, whereby the staves may be expeditiously and accurately fitted with reference to taper and proper bevel of the edges. This I accomplish by causing the plank from which the stave is to be made to be carried upon a moving table traveling on fixed ways to a circular saw fastened to the end of a short shaft supported on an independent adjustable frame, the proper bevel being given to the edge of the stave by means of circular segments fastened to the traveling table for supporting the plank.

In the drawings, Figure 1 represents a sectional longitudinal elevation of the machine. Fig. 2 represents a general plan of the same. Fig. 3 shows an end view of the machine in section, the bed F F being cut between the saw A and chain-wheel H. Fig. 4 is a sectional view of the saw and saw-frame, which is shown behind the bed in Fig. 1.

The saw A is on the end of a short shaft which runs in boxes secured to the adjustable frame E. The saw is driven by belting onto the pulley B. The lower end of the frame C is hinged to a suitable support, E, fastened to the floor. Two braces, D D, whose lower ends are secured to the support E, have slots in their upper ends for receiving the bolts by means of which the saw is adjusted and secured at the desired height.

The plank from which the stave is to be sawed is carried on a table, G, which slides upon ways secured to the bed-pieces F F. The saw is placed midway between the ends of the bed F F, and so as to run close to the edge of the sliding table G.

The plank may be fed to the saw by pushing the table G along on its ways, or it may be moved by a chain running on chain-wheels H H', one of which, H, is attached to a short shaft, on which are two pulleys, I and J, driven in opposite directions, and between which is a clutch by means of which either of the pulleys is made to drive the the chain-wheel H at pleasure. When the clutch engages the pulley J the table is driven forward, and when it engages the pulley I the table is driven backward. The pulley I is driven more rapidly than the pulley J, so as to cause the table to return quicker than it is driven forward while sawing.

After the table has moved sufficiently far in either direction its motion may be arrested by an automatic arrangement consisting of a rod, L, connecting with the bent lever K, which moves the clutch, and having stops M and N, against which stops O and P, attached to the table, strike and disengage the clutch from the pulleys I and J.

O is an adjustable stop. When the table has moved forward the required distance for sawing the stave the stop O strikes against the stop N, disengaging the clutch from the pulley J, and the table ceases to move. The operator then moves the rod L so as to engage the clutch with the pulley I. The table then moves back until the stop P strikes the stop M, when the clutch is again disengaged and the table stands at rest until the operator starts it forward by moving the rod L so as to again engage the clutch with the pulley J.

A plank laid flat upon the table G would have its edge sawed square with its face; but as the edges of a stave need to be beveled so that their planes will intersect at the center of the tank, the plank from which a stave is to be sawed is made to rest upon curved segments Q Q, fastened to the table G, as shown in Figs. 2 and 3. The upper surface of the segments on which the plank rests is curved to correspond to the diameter of the tank—that is, the curve is a segment of a circle equal in diameter to the outside of the tank, and as placed upon the table the center from which the curve is described should be in the plane of the saw.

If the staves of a tank were to be all of a width, plane surfaces inclined at a proper angle would answer in place of the circular segments; but convenience and economy in the use of lumber makes it desirable to saw successive staves of various widths, giving the proper bevel to the edges of each stave whatever its width, and this is what we accomplish by the use of the circular segments Q Q.

Of course there must be a set of segments for each diameter of tank.

The saw is placed upon an independent frame, so as to allow of easy adjustment, not only in the matter of height, but also as to the angle which the saw-shaft makes with the edge of the table.

In place of the saw, a planer or cutter-head may be used for planing the edges of the staves.

What I claim as my invention is—

In a machine for sawing tank-staves, the circular segments Q Q, attached to the movable table G, for the purpose of carrying the plank to the saw so as to give the edges of the staves a proper bevel, as herein shown and described.

DANIEL HALLADAY.

Witnesses:
GEO. O. SPOONER,
EDWARD J. PARKER.